United States Patent [19]

Forsberg

[11] Patent Number: 4,677,608

[45] Date of Patent: Jun. 30, 1987

[54] METHOD OF TRANSFERRING AN ADDITIONAL INFORMATION CHANNEL ACROSS A TRANSMISSION MEDIUM

[75] Inventor: Gunnar S. Forsberg, Stockholm, Sweden

[73] Assignee: Telefonaktiebolaget LM Ericsson, Stockholm, Sweden

[21] Appl. No.: 616,210

[22] PCT Filed: Oct. 19, 1983

[86] PCT No.: PCT/SE83/00354

§ 371 Date: May 18, 1984

§ 102(e) Date: May 18, 1984

[87] PCT Pub. No.: WO84/01679

PCT Pub. Date: Apr. 26, 1984

[30] Foreign Application Priority Data

Oct. 22, 1982 [SE] Sweden .............................. 8206011

[51] Int. Cl.[4] .............................................. H04B 9/00
[52] U.S. Cl. ............................................ 370/11; 370/3
[58] Field of Search .................... 370/1, 2, 3, 8, 9, 11; 375/22

[56] References Cited

U.S. PATENT DOCUMENTS 3,603,882  9/1971  Wilson ................................. 370/11
3,718,766  2/1973  Stover ................................. 370/11

FOREIGN PATENT DOCUMENTS 2845598    4/1979  Fed. Rep. of Germany ........ 375/22
45-32486  10/1970  Japan ................................... 375/22
50-125808  4/1977  Japan ................................... 370/11
50-146574  6/1977  Japan ................................... 370/11
56-24840   3/1981  Japan ................................... 370/11
57-18145   1/1982  Japan ................................... 370/11

OTHER PUBLICATIONS

"Novel Supervision Channel"—Cochran et al—Electronic Letters, Jul. 31, 1980, vol. 16, #6-pp. 624-620.
Buijs—"Philips Optical Fibre Transmission"—Philips Telecommunication Review-vol. 40, #2, Jul. 1982, pp. 71-88.

*Primary Examiner*—Joseph A. Orsino, Jr.
*Attorney, Agent, or Firm*—Roberts Spiecens & Cohen

[57] ABSTRACT

A method of transferring a service channel over a fibre optic system line is proposed. The system line normally transmits regular data signals with a specific highfrequency (34% Mbits), which are coded according to a certain code. The power spectrum of the code is heavily suppressed for lowfrequencies. In accordance with the invention, the space at $f=0$ is utilized to transmit a service channel with a low bandwidth. The service channel signals are frequency modulated and the frequency modulated signal is caused to pulse width modulate pulses forming the regular data signal. The pulse width modulation is done in two different ways, depending on whether the data signal is an RZ-coded bit flow or an NRZ-coded bit flow.

4 Claims, 6 Drawing Figures

METHOD OF TRANSFERRING AN ADDITIONAL INFORMATION CHANNEL ACROSS A TRANSMISSION MEDIUM

FIELD OF INVENTION

The invention relates to a method of transmitting data and more particularly a method of transferring additional information, e.g. across an optical fibre line transmitting regular telephony signals. The proposed method is primarily for use with a 34 Mbits/s fibre optic conductor or a 140 Mbits/s fibre optic conductor.

The problem solved by the invention is that of transmitting an extra low-frequency information channel on an optical fibre at low cost. The low-frequency information channel may be for service telephony for example.

BACKGROUND

The problem of transmitting an extra information channel further on ordinary telephony channels has previously been solved in several ways:

(1) A service channel can be transmitted by integrating a copper pair in a fibre cable, for example. This is cheap and relatively reliable, but such a solution is not accepted by certain telephone administrations nor in certain markets.

(2) A service channel can be transmitted by using bits in the regular bit flow, e.g. by manipulating data as is described in Swedish patent application No. 8105914-9. In this case the transmission of the extra information channel is entirely digital, and coders/decoders or complicated synchronizing circuits are required to enable injection or extraction of the extra information bits.

(3) A further method of transmitting a service channel is described in "Electronic Letters" July 31, 1980, Vol. 16 No. 16 "Novel Supervisory Channel for Fiber Optic Transmission System".

(4) Finally, there is described in Philips Telecommunication Review, Vol. 40, No. 2, July 1982, "Philips Optical Fiber Transmission System: II. The Equipment Family", a method of transmitting an information channel by modulating the amplitude of the bit flow which is to transmit the regular data signals. The transmission of both service channel and data signals is performed with the aid of light pulses amplitude-modulated by the information channel.

According to item 2 above, it would in principle be possible to transmit a service channel by adding an extra telephone channel to the other channels transmitted by the regular bit flow. In this case, the extra channel must be coupled through all the repeaters in the connection to fill its function as a service channel, which causes problems by further demands having to be made on the transmission medium and the switching functions in the respective exchanges.

DISCLOSURE OF INVENTION

In low-frequency amplitude modulation according to method (4) above, there are the following disadvantages:

(a) Vibrations in the optocontact and fibre channel, which can disturb the transmission.

(b) Poor signal-noise ratio in the transmission of telephone calls.

(c) Heavy low-frequency 1/f noise from certain semiconductor lasers, used in generating the light pulses.

(d) Sensitivity to non-linearities in the light-emitting element in the transmission of analogue baseband signals.

SUMMARY OF INVENTION

In accordance with one embodiment of the invention, the signal corresponding to the service channel is first frequency-modulated with a middle frequency substantially lower than the bit frequency of the bit flow. There is thus transmitted an FM channel having a higher frequency than the service channel, resulting in that the disadvantages according to items (a) and (d) of method (4) are reduced.

An object of the present invention is to provide a method of transmitting an extra information channel, preferably for a fibre optical system line, which transmits a data flow of high bit frequency such that the service channel can be reached by all repeaters along the system line without unnecessary multiplication and without making the system line transmission properties more complicated.

BRIEF DESCRIPTION OF DRAWINGS

The invention will now be described in detail with reference to the accompanying drawing in which.

DETAILED DESCRIPTION

Figure 1:
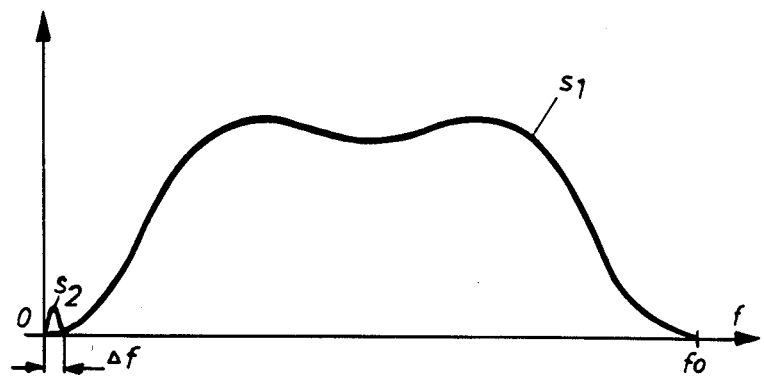
FIG. 1 is a frequency diagram of the code used and the extra information channel.

The method in accordance with the invention is only possible if the code used has a heavily suppressed power spectrum for low frequencies. In FIG. 1 there is shown the power spectrum curve $s_1$ for such a code, a so-called 5B6B code. If the data flow is initially coded with a code having a spectrum not including this property, it is possible to perform some form of recoding (block coding) in order to meet the aforementioned conditions. In accordance with the proposed method, an information channel is transmitted simultaneously with the regular data signals, the frequency spectrum of this code being indicated by the curve $s_2$ in FIG. 1, and the bandwidth of which is $\Delta f << f_o$ where $f_o$ is the bit rate of the transmitted data flow. The frequency spectrum $s_2$ does not however need to lie exactly at the frequency $f=0$, but must lie within the range at $f=0$ where the power spectrum of the code is suppressed, in accordance with the above.

Figure 2:
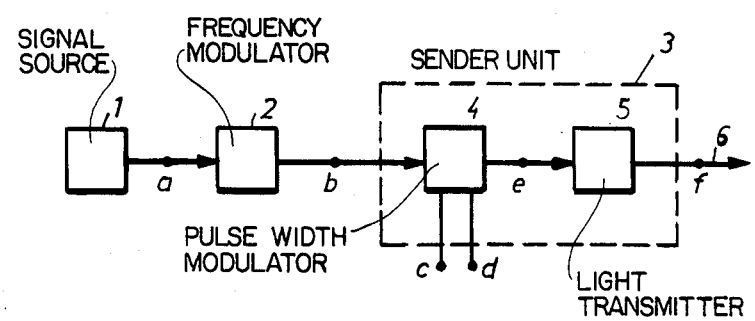
FIG. 2 is a block diagram of a sender unit for an extra information channel in accordance with the proposed method.

An embodiment is illustrated in FIG. 2 of a sender unit for transmitting an extra information channel in accordance with the proposed method.

A signal source 1 transmits a speech band and a data channel for fault localization within a frequency band of 0.3–4 kHz, which forms the extra information channel. The signal source may consist of a telephony terminal. The signals across the output a of the signal source are supplied to a frequency modulator 2, which can be a voltage frequency converter of a known kind, e.g. National Semiconductor, LM331A, which has good linearity within the frequency band used. From the output b of the frequency modulator 2 there is obtained a frequency-modulated signal, illustrated in FIG. 3b, within a frequency band of 35 kHz to 65 kHz, for example.

A sender unit 3 consists of a laser transmitter or a light emitting diode (LED) transmitter, and includes a pulse width modulator 4 as well as a light transmitter block 5 containing a laser or LED with associated driving stages. The block 5 is of an implementation known per se, and is therefore not described any further. The block 4 has one input connected to the output b of the frequency modulator 2 and two further inputs denoted c and d. Depending on whether the regular data signal is a bit flow in RZ or NRZ form, the inputs c and d are used according to the following.

(a) A data signal in the form of an RZ-coded bit flow across input c, input d not being used, or (b) a data signal in the form of an NRZ-coded bit flow across the input d, and a clock signal with the bit frequency $f_o = 1/T$ to the the input c. The block 4 is described in detail for the respective case in FIGS. 4 and 5.

Figure 3:
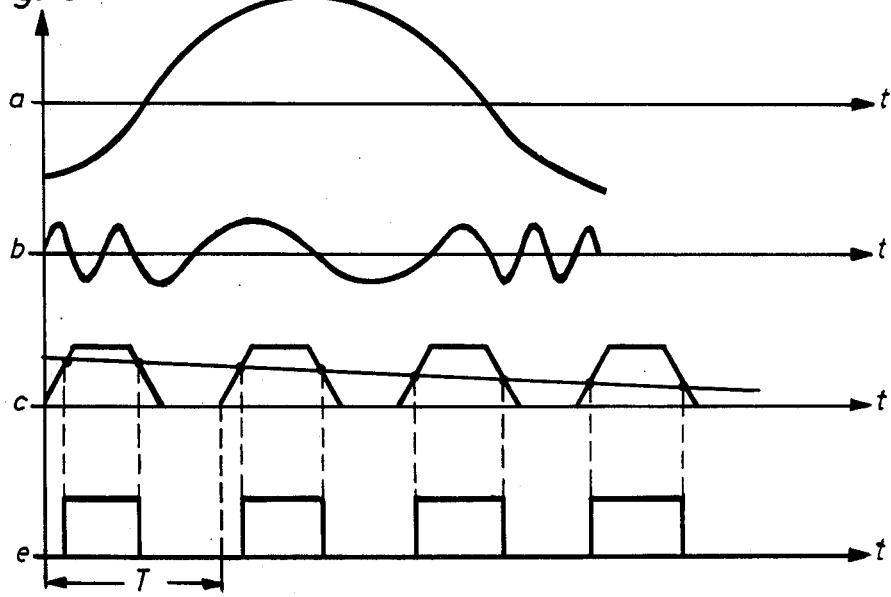
FIG. 3 is a time chart for the signals in the sender units accoerding to FIG. 2.

In the embodiment according to FIG. 2, pulse width modulation takes place in block 4 for case (a) above, of the RZ-coded bit flow, and of the clock signal in case (b), in both cases there being applied to the laser driving block 5 the bit flow modulated by the information channel, for converting to light pulses which are transmitted over the fibre optical system line 6. In FIG. 3c the clock signal applied to the input c is illustrated, in which each pulse has a rising flank and a falling flank, and an enlarged part of the modulating signal according to FIG. 3b. Since this signal has a frequency within the kHz range, while the bit frequency of the clock signal is of the order of magnitude 40 MHz, the modulating signal may be approximated by a straight line in FIG. 3c. The appearance of the pulse width modulated control pulses across the output e to the laser driving block 5 and the light pulses sent over the line 6 are apparent from FIG. 3e.

Figure 4:
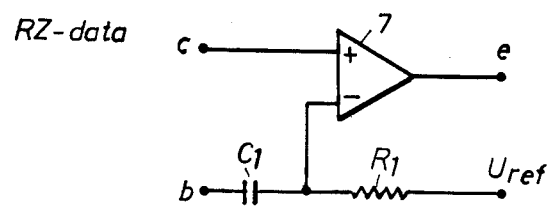
FIG. 4 is a circuit diagram of one embodiment of a pulse width modulator included in the sender unit according to FIG. 2.

FIG. 4 illustrates a simple circuit for realizing the pulse width modulator in accordance with block 4 in the case where the regular data flow consists of an RZ bit flow. The pulse width modulator consists of a comparator 7. In this case the regular data signal in RZ from occurs at its plus input. Its minus input in connected via an RC coupling $R_1C_1$ to the output b of the frequency modulator 2. A direct voltage $U_{ref}$ gives a suitable bias via the resistor $R_1$ to the minus input of the comparator.

Figure 5:
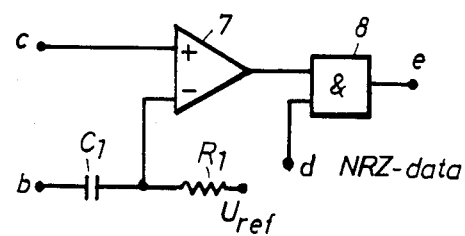
FIG. 5 is a circuit diagram of a second embodiment of the pulse width modulator.

In FIG. 5, the embodiment illustrated is utilized in the case where the regular data signal consists of NRZ data, and in this embodiment an AND circuit 8 has one input connected to the output of the comparator 7. The latter only receives the clock signals over its plus input in this case. As in the circuit according to FIG. 4, the frequency-modulated information signal is supplied across the capacitor input, a pulse width modulated clock signal then occuring at the comparator output. A pulse width modulated data signal of the RZ type is obtained at the output e of the AND circuit, this signal then being applied to the laser driving block 5.

Figure 6:
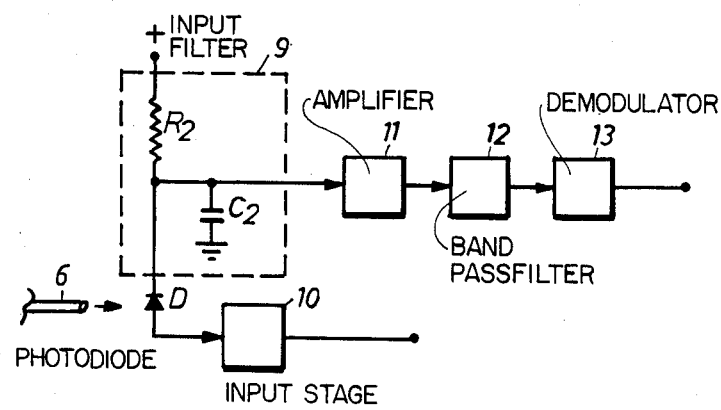
FIG. 6 is a block diagram of a receiver unit corresponding to the sender unit according to FIG. 2.

FIG. 6 illustrates a suitable embodiment of the receiver unit corresponding to the sender unit according to FIG. 2. The input side of the receiver unit contains a photodiode D, the cathode of which is connected to an input filter 9 for the extra information channel. The anode of the photodiode is conventionally connected to the input stage 10 of the receiver unit. The input filter 9 consists of a link including the resistor $R_2$ and the capacitor $C_2$. The resistor $R_2$ furthermore serves to bias the photodiode D. This filter has a boundary frequency $= 1/R_2 (C_2+C_d)$, where $C_d$ is the capacitance of the photodiode. The boundary frequency of the filter 9 should be high enough to couple through the frequency band $\Delta f$ according to FIG. 1. After the filter 9 there follows conventionally an amplifier 11, a bandpass filter 12 ($f_o$ = the middle frequency of the frequency modulator) and a frequency demodulator 13, connected for extracting the extra information channel. The regular data signal is obtained at the output of the input stage 10. The advantage of having, in accordance with FIG. 6, an input filter 9 before the input stage 10 is that (a) the input stage may be over-modulated without affecting the information signal (b) the input stage operation does not affect extracting the information signal (c) the noise characteristics of the input stage are not affected, and it does not need to have a low lower-frequency limit.

The extra information signal has been frequency modulated before pulse width modulation in the embodiment according to FIG. 2 for the sender side and in FIG. 6 for the receiver side. This results in modulation of the average power of the regular data signal. By utilizing other modulation methods it is also possible to modulate the average power without previously carrying out a frequency modulation. Transmission of the service channel will then be somewhat poorer then as discussed in the introduction to the description. Mean power modulation of the data signal can also take place with other types of modulation than pulse width modulation. For example, the regular data signal may consist of a bipolar pulse flow (bit flow) with the extra information signal superimposed on the regular data signal. As with the pulse width modulation already described, this gives an average power modulation of the data signal.

I claim:

1. A method comprising transferring an additional signal via an optical fibre line, over which there is sent a regular data signal in the form of a bit flow of the pulse type between a sender side and a receiver side, said bit flow being coded such that the low-frequency portion of the code spectrum of the flow is heavily suppressed, the additional signal having a band width ($\Delta f$) which is substantially less than the bit frequency ($1/T = f_o$) of the regular data signal, the additional signal (a) being frequency modulated to form a frequency-modulated signal (b) with a center frequency ($f_m$) which is substantially lower than the bit frequency ($f_o$) of the regular data signal and the frequency-modulated signal being caused to pulse-width modulate the regular data signal such that information originating from the additional signal (a) will be located in said low-frequency portion of said code spectrum near zero frequency, the modulated data signal thus obtained being transferred and detected on the receiver side, and a frequency demodulation being carried out on the receiver side for extracting the additional signal.

2. Method as claimed in claim 1 wherein the data signal is in the form of a bit flow of the return-to-zero (RZ) type.

3. Method as claimed in claim 1 wherein the data signal is in the form of a bit flow of the non-return-to-zero (NRZ) type.

4. A method as claimed in claim 1 wherein the frequency modulated signal (b) is superimposed on a regular data signal.

* * * * *